(12) United States Patent
Hwang et al.

(10) Patent No.: US 12,269,348 B2
(45) Date of Patent: Apr. 8, 2025

(54) APPARATUS FOR CONTROLLING AUTONOMOUS DRIVING OF INDEPENDENT DRIVING ELECTRIC VEHICLE AND METHOD THEREOF

(71) Applicant: RESEARCH & BUSINESS FOUNDATION SUNGKYUNKWAN UNIVERSITY, Suwon-si (KR)

(72) Inventors: Sung Ho Hwang, Seoul (KR); Ho Yong Na, Cheonan-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 228 days.

(21) Appl. No.: 17/879,085

(22) Filed: Aug. 2, 2022

(65) Prior Publication Data

US 2023/0131835 A1 Apr. 27, 2023

(30) Foreign Application Priority Data

Aug. 2, 2021 (KR) .......................... 10-2021-0101365

(51) Int. Cl.
*B60L 15/20* (2006.01)
*B60W 30/02* (2012.01)
(Continued)

(52) U.S. Cl.
CPC ............. *B60L 15/20* (2013.01); *B60W 30/02* (2013.01); *B60W 30/12* (2013.01);
(Continued)

(58) Field of Classification Search
CPC ............... B60L 15/20; B60L 2240/463; B60L 2240/465; B60L 3/0076; B60L 2240/24;
(Continued)

(56) References Cited

U.S. PATENT DOCUMENTS

2020/0156607 A1* 5/2020 Ueno .................... B60W 30/02
2021/0269062 A1* 9/2021 Yasutomi .................. G06T 7/50
(Continued)

FOREIGN PATENT DOCUMENTS

KR 10-1473587 B1 12/2014
KR 10-2018-0138324 A 12/2018
KR 10-2021-0010729 A 1/2021

*Primary Examiner* — Yufeng Zhang
(74) *Attorney, Agent, or Firm* — NSIP Law (57) ABSTRACT

Disclosed are an apparatus and method for controlling autonomous traveling of an independent driving electric vehicle. An apparatus for controlling autonomous traveling of an independent driving electric vehicle according to one aspect of the present disclosure includes a measurement unit configured to measure traveling information of a vehicle, a steering angle controller configured to calculate a steering angle for following a look ahead point based on path information of the vehicle and the traveling information, and control the vehicle according to the steering angle, and a torque vectoring controller configured to calculate a lateral error and an angular error of the vehicle based on the path information and the traveling information, generate a control moment based on the lateral error and the angular error, and control a motor torque of each motor based on the control moment.

16 Claims, 4 Drawing Sheets

(51) Int. Cl.
*B60W 30/12* (2020.01)
*B60W 60/00* (2020.01)

(52) U.S. Cl.
CPC ...... *B60W 60/001* (2020.02); *B60L 2240/463* (2013.01); *B60W 2510/20* (2013.01); *B60W 2520/20* (2013.01); *B60W 2720/30* (2013.01)

(58) Field of Classification Search
CPC .......... B60L 2240/22; B60L 2240/423; B60W 60/001; B60W 30/02; B60W 30/12; B60W 2510/20; B60W 2520/20; B60W 2720/30
See application file for complete search history.

(56) References Cited

U.S. PATENT DOCUMENTS

| | | | |
|---|---|---|---|
| 2022/0009522 A1* | 1/2022 | Zhang | B62D 1/286 |
| 2022/0227354 A1* | 7/2022 | Hagiwara | B60T 8/1755 |
| 2022/0334578 A1* | 10/2022 | Raeis Hosseiny | H04M 1/72448 |
| 2023/0347861 A1* | 11/2023 | Sugawara | B60W 40/105 |

* cited by examiner

APPARATUS FOR CONTROLLING AUTONOMOUS DRIVING OF INDEPENDENT DRIVING ELECTRIC VEHICLE AND METHOD THEREOF

TECHNICAL FIELD

The present disclosure relates to an apparatus and method for controlling autonomous traveling of an independent driving electric vehicle, and more specifically, to an apparatus and method for controlling autonomous traveling of an independent driving electric vehicle, which enable smooth traveling without requiring enormous computational performance.

BACKGROUND ART

In general, an independent driving system has a concept including a system for driving a vehicle using an in-wheel motor, and is a system for independently driving the vehicle even when a motor is not attached to a wheel. The independent driving system is one of drive system arrangement methods of electric vehicles (EVs), and conventional electric vehicles are equipped with a motor instead of an engine of conventional engine vehicles, but a recent independent driving method directly drives vehicle wheels (i.e., wheels) by arranging a motor close to the driving wheel.

In addition to a good responsiveness to a driver's operation of an accelerator, the independent driving method has the advantage of making the vehicle's behavior more freely upon cornering by an operation of a steering wheel because the independent driving method may independently control left and right vehicle wheels (i.e., wheels). In addition, since each wheel may be controlled by the independent driving, a torque for each wheel can be adjusted, so that it is possible to improve behavioral performance of the vehicle.

Meanwhile, control methods for autonomous vehicles include Stanley, pure pursuit, and model predictive control (MPC) methods. The Stanley control method is a method of calculating a steering input using lateral/angular errors of a front wheel axle of the vehicle, and the pure pursuit control method is a method of controlling a future path based on a look ahead point. In addition, the MPC control method is a model-based method, and a method of optimally calculating a current steering input by predicting the near future.

However, the Stanley control method has the disadvantage that serious jerking of the vehicle occurs, and the pure pursuit control method provides smooth traveling but has the disadvantage that lateral/distance errors occur. In addition, the MPC control method has a problem that a calculation cycle of an algorithm is slowed down due to a large amount of calculations, resulting in increasing risks, and a problem that configurations are difficult and tuning is difficult due to too many design variables and factors to consider for making a vehicle model having a high degree of freedom.

Accordingly, there is a need for the development of an autonomous traveling control technique for an independent driving electric vehicle that enables smooth traveling without requiring enormous computational performance.

The background technology of the present disclosure is disclosed in Korean Registration Patent Publication No. 10-1473587 (registered on Dec. 10, 2014, entitled IN-WHEEL DRIVING SYSTEM FOR VEHICLE).

DISCLOSURE

Technical Problem

The present disclosure has been made to solve the above problems, and is directed to providing an apparatus and method for controlling autonomous traveling of an independent driving electric vehicle, which enable smooth traveling without requiring enormous computational performance.

The object of the present disclosure is not limited to the above-described object(s), and other objects not mentioned will be able to be clearly understood to those skilled in the art from the following description.

Technical Solution

An apparatus for controlling autonomous traveling of an independent driving electric vehicle according to one aspect of the present disclosure includes a measurement unit configured to measure traveling information of a vehicle, a steering angle controller configured to calculate a steering angle for following a look ahead point based on path information of the vehicle and the traveling information, and control the vehicle according to the steering angle, and a torque vectoring controller configured to calculate a lateral error and an angular error of the vehicle based on the path information and the traveling information, generate a control moment based on the lateral error and the angular error, and control a motor torque of each motor based on the control moment.

In the present disclosure, the steering angle controller may calculate the steering angle by applying a look ahead distance based on the path information and the traveling information to a kinematic model.

In the present disclosure, the torque vectoring controller may perform a lane keeping assist system (LKAS)-based torque vectoring.

In the present disclosure, the torque vectoring controller may generate the control moment by applying the path information and the traveling information to a dynamic model.

In the present disclosure, the torque vectoring controller may calculate a front wheel steering angle based on the lateral error and the angular error, and generate the control moment using the front wheel steering angle.

In the present disclosure, the torque vectoring controller may generate an additional motor torque by dividing the control moment by a tread, which is a distance between centers of left and right vehicle wheels, distribute the additional motor torque to a rear wheel motor, and distribute a part of the additional motor torque to a front wheel motor when the motor torque exceeds a maximum torque of the rear wheel motor.

In the present disclosure, the apparatus may further include an electronic stability control (ESC) entry determination unit configured to receive a first lateral slip angle calculated based on the lateral error and the angular error from the torque vectoring controller, receive a second lateral slip angle from an electronic stability control (ESC) unit, and determine whether to enter the ESC unit according to a comparison result between the first lateral slip angle and the second lateral slip angle.

In the present disclosure, the ESC entry determination unit may transmit a control entry signal for driving the ESC unit to the ESC unit when a difference between the first lateral slip angle and the second lateral slip angle exceeds a preset certain value.

A method of controlling autonomous traveling of an independent driving electric vehicle according to one aspect of the present disclosure includes measuring traveling information of a vehicle, by a measurement unit, calculating a steering angle for following a look ahead point based on path information of the vehicle and the traveling information and controlling the vehicle according to the steering angle, by a steering angle controller, and calculating a lateral error and an angular error of the vehicle based on the path information and the traveling information, generating a control moment based on the lateral error and the angular error, and controlling a motor torque of each motor based on the control moment, by a torque vectoring controller.

In the present disclosure, in the controlling of the vehicle according to the steering angle, the steering angle controller may calculate the steering angle by applying a look ahead distance based on the path information and the traveling information to a kinematic model.

In the present disclosure, in the controlling of the motor torque of each motor, the torque vectoring controller may perform a lane keeping assist system (LKAS)-based torque vectoring.

In the present disclosure, in the controlling of the motor torque of each motor, the torque vectoring controller may generate the control moment by applying the path information and the traveling information to a dynamic model.

In the present disclosure, in the controlling of the motor torque of each motor, the torque vectoring controller may calculate a front wheel steering angle based on the lateral error and the angular error, and generate the control moment using the front wheel steering angle.

In the present disclosure, in the controlling of the motor torque of each motor, the torque vectoring controller may generate an additional motor torque by dividing the control moment by a tread, which is a distance between centers of left and right vehicle wheels, distribute the additional motor torque to a rear wheel motor, and distribute a part of the additional motor torque to a front wheel motor when the motor torque exceeds a maximum torque of the rear wheel motor.

In the present disclosure, the method may further include receiving a first lateral slip angle calculated based on the lateral error and the angular error from the torque vectoring controller, receiving a second lateral slip angle from an electronic stability control (ESC) unit, and determining whether to enter a control of the ESC unit according to a comparison result between the first lateral slip angle and the second lateral slip angle, by an ESC entry determination unit.

In the present disclosure, in the determining of whether to enter the control of the ESC unit, the ESC entry determination unit may transmit a control entry signal for driving the ESC unit to the ESC unit when a difference between the first lateral slip angle and the second lateral slip angle exceeds a preset certain value.

In addition, other methods and other systems for implementing the present disclosure and computer programs for executing the method may be further provided.

Advantageous Effects

According to an apparatus and method for controlling autonomous traveling of an independent driving electric vehicle according to one embodiment of the present disclosure, it is possible to control a front wheel steering angle using a pure pursuit algorithm that uses a look ahead point among future paths, and correct a lateral error and an angular error through an LKAS-based torque vectoring that uses a path angular error and lateral error of the current center of gravity, thereby enabling smooth traveling even without requiring enormous computational performance, and performing a precise path follow-up control.

According to the apparatus and method for controlling the autonomous traveling of the independent driving electric vehicle according to one embodiment of the present disclosure, it is possible to delay an ESC entry time point because a constant moment control is performed by using the lateral error/angular error of a traveling path from the viewpoint of stability of the vehicle.

According to the apparatus and method for controlling the autonomous traveling of the independent driving electric vehicle according to one embodiment of the present disclosure, the ESC entry is essential when the vehicle loses stability and starts to slip, and it is possible to strengthen connectivity between autonomous traveling control and chassis control systems by providing an index for ESC entry in the constant moment control of the LKAS-based torque vectoring.

According to the apparatus and method for controlling the autonomous traveling of the independent driving electric vehicle according to one embodiment of the present disclosure, it is possible to improve the stability of the vehicle by first using a rear wheel motor so as not to hinder longitudinal control of an autonomous traveling system, and considering the correction of lateral/angular errors as a higher priority than the longitudinal control of the vehicle when the rear wheel motor is saturated.

According to the apparatus and method for controlling the autonomous traveling of the independent driving electric vehicle according to one embodiment of the present disclosure, it is possible to reduce a cut corner phenomenon of the pure pursuit and enable traveling on a road having a high curvature such as a U-turn.

Meanwhile, the effects of the present disclosure are not limited to the above-described effects and may include various effects within the scope that is obvious to those skilled in the art from the following description.

DETAILED DESCRIPTION OF EXEMPLARY EMBODIMENTS

Hereinafter, an apparatus and method for controlling autonomous traveling of an independent driving electric vehicle according to one embodiment of the present disclosure will be described with reference to the accompanying drawings. In this process, the thicknesses of the lines or the sizes of the components shown in the drawings may be exaggerated for clarity and convenience of description.

In addition, implementations described herein may be implemented as, for example, a method, a process, an apparatus, a software program, a data stream, or a signal. Although discussed only in the context of a single form of implementation (e.g., described only as a method), the described features may also be implemented in other forms (e.g., an apparatus or a program). The apparatus may be implemented in appropriate hardware, software, firmware, and the like. The method may be implemented in an apparatus such as, for example, a processor, which generally refers to a processing device including a computer, a microprocessor, an integrated circuit, a programmable logic device, or the like. The processor may also include a communication device such as a computer, a cell phone, a personal digital assistant (PDA), and other devices that facilitate communication of information between end-users.

In addition, the terms used herein are used only to describe specific embodiments, and are not intended to limit the present disclosure. The singular expression includes the plural expression unless the context clearly dictates otherwise. In this application, it should be understood that terms such as "comprise" or "have" are intended to specify that a feature, number, step, operation, component, part, or combination thereof described in the specification exists, but do not preclude the presence or additional possibility of one or more other features numbers, steps, operations, components, parts, or combinations thereof. Terms such as first and second may be used to describe various components, but the components should not be limited by the terms. The terms are used only for the purpose of distinguishing one component from another.

Throughout the specification, a "vehicle" may include an independent driving electric vehicle, and the independent driving electric vehicle has a concept that includes an in-wheel electric vehicle, and may be an electric vehicle in a form that may be driven independently even when a motor is not attached to a wheel.

Hereinafter, embodiments according to the present disclosure will be described in detail with reference to the accompanying drawings, and in the description with reference to the accompanying drawings, the same or corresponding components are given the same reference numerals, and overlapping descriptions thereof will be omitted.

Figure 1:
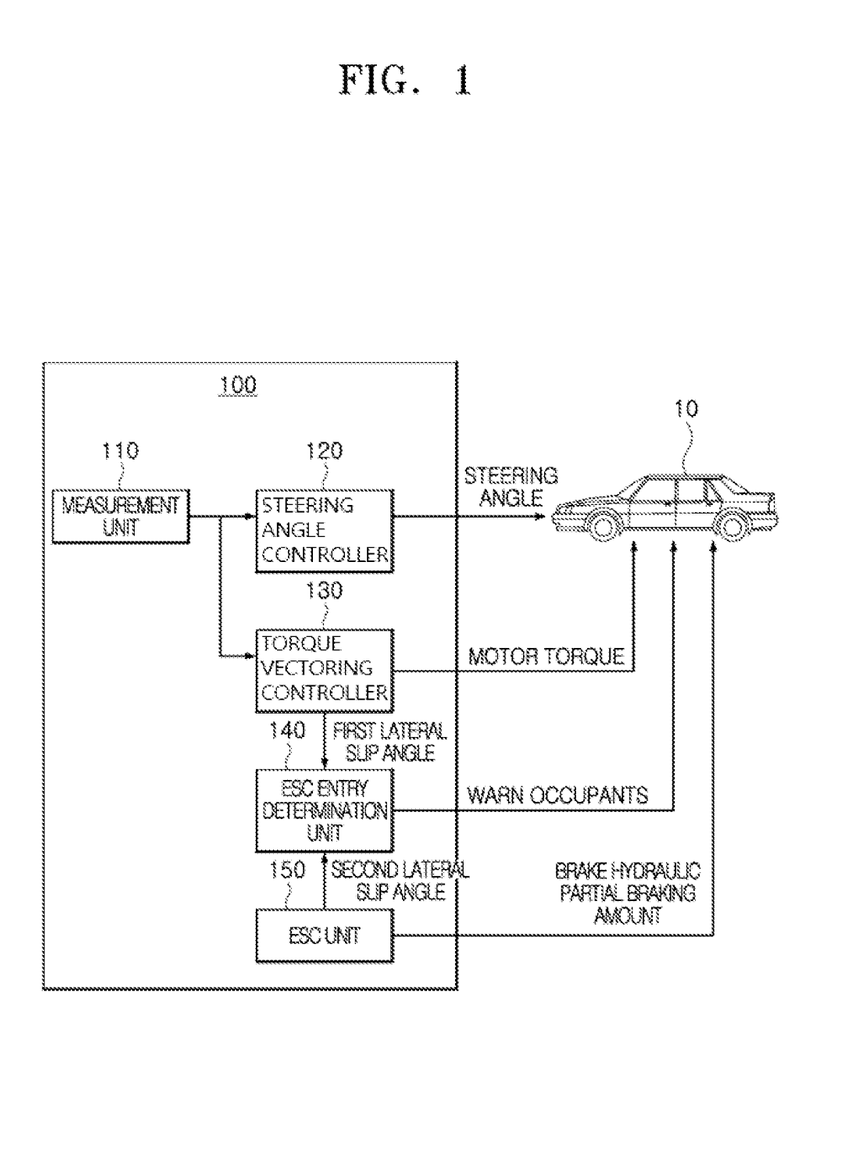
FIG. 1 is a block diagram schematically showing an apparatus for controlling autonomous traveling of an independent driving electric vehicle according to one embodiment of the present disclosure.
Figure 2:
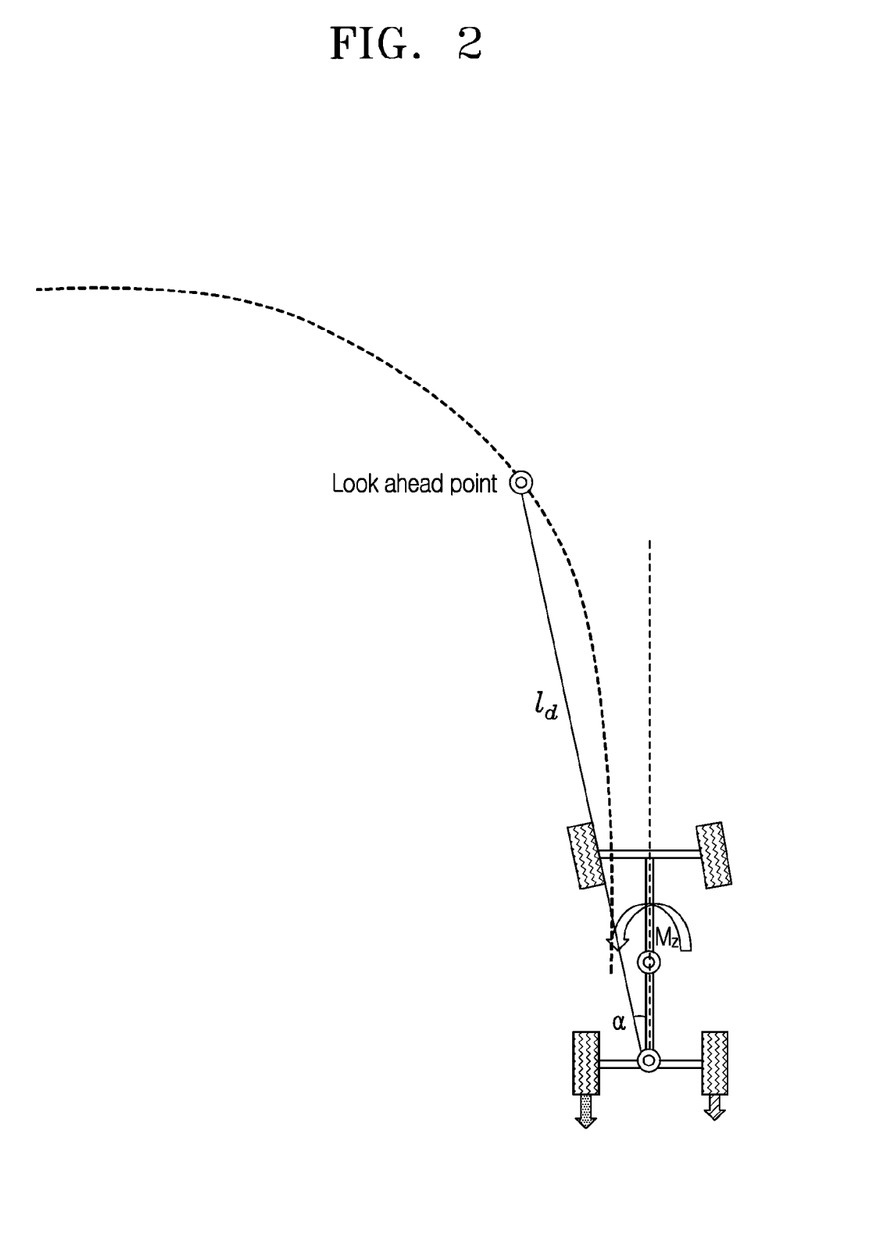
FIG. 2 is an exemplary view for describing a pure-pursuit algorithm according to one embodiment of the present disclosure.
Figure 3:
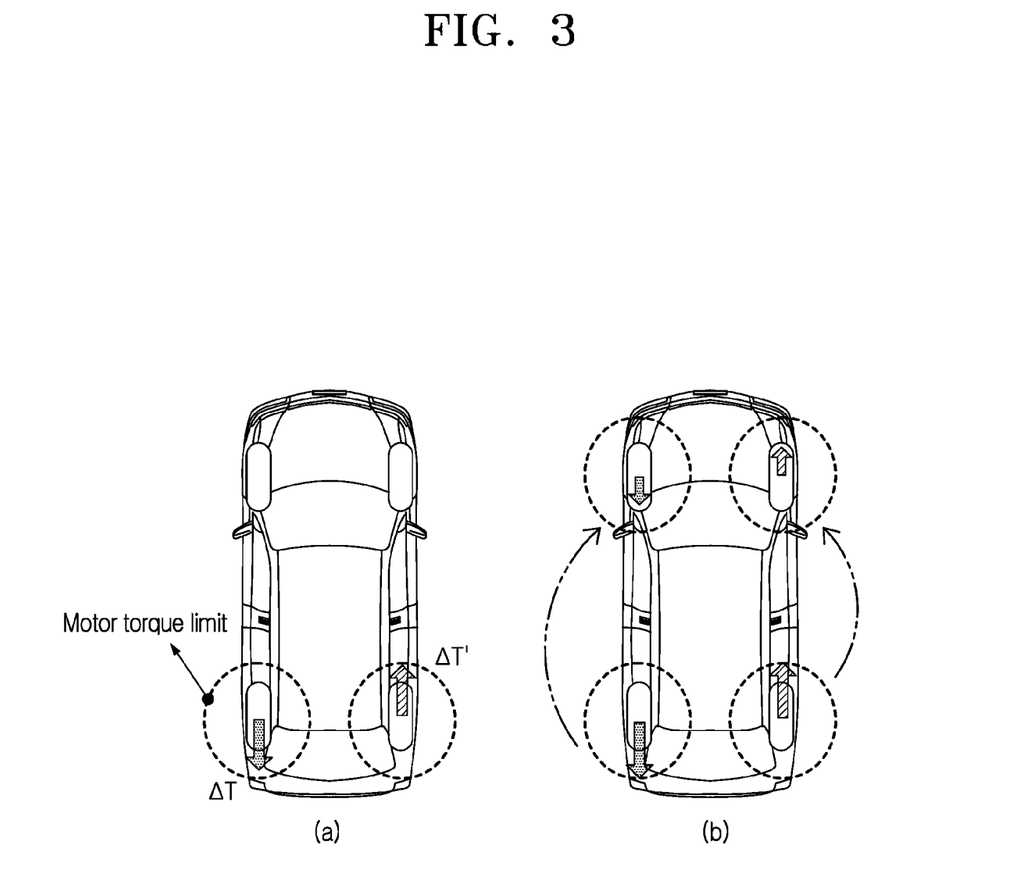
FIG. 3 is an exemplary view for describing a distribution of an additional motor torque according to one embodiment of the present disclosure.

FIG. 1 is a block diagram schematically showing an apparatus for controlling autonomous traveling of an independent driving electric vehicle according to one embodiment of the present disclosure, FIG. 2 is an exemplary view for describing a pure-pursuit algorithm according to one embodiment of the present disclosure, and FIG. 3 is an exemplary view for describing a distribution of an additional motor torque according to one embodiment of the present disclosure.

Referring to FIG. 1, an apparatus 100 for controlling autonomous traveling for an independent driving electric vehicle according to one embodiment of the present disclosure includes a measurement unit 110, a steering angle controller 120, a torque vectoring controller 130, an electronic stability control (ESC) entry determination unit 140, and an ESC unit 150.

The measurement unit 110 may measure traveling information of a vehicle 10. In other words, the measurement unit 110 may measure the traveling information including a position, a steering angle, a yaw rate, a longitudinal speed, a wheel speed, a steering angular speed, a longitudinal speed, a lateral speed, a lateral acceleration, a longitudinal acceleration, and the like of the vehicle 10. The traveling information measured by the measurement unit 110 may be measured from various sensors provided in the vehicle 10. For example, the vehicle 10 may be equipped with sensors such as a camera, a GPS, longitudinal/lateral acceleration sensors, a yaw rate sensor, a steering angle sensor, an inertial measurement unit (IMU) sensor, a wheel speed sensor, an acceleration sensor, a speed sensor, a steering angle sensor, and an inertial sensor, and the measurement unit 110 may measure or receive the traveling information from each of the sensors.

The steering angle controller 120 may calculate a steering angle for following a look ahead point based on path information of the vehicle 10 and the traveling information measured by the measurement unit 110, and control the vehicle 10 according to the steering angle. Here, the path information may be a traveling path of the vehicle 10 generated based on a precision map. The precision map as an electronic map is three-dimensional map data with high accuracy that provides both static and dynamic information, and may include all lanes and signs and provide precise information on a lane-by-lane basis.

The steering angle controller 120 may control the steering angle using the pure-pursuit algorithm. In other words, the steering angle controller 120 may calculate the steering angle by applying a look ahead distance based on the path information and position information to a kinematic model. The pure-pursuit algorithm is a control method using a curvature of an arc connecting a specific point of a front target path and a center of a rear wheel of the vehicle 10. The look ahead point, which becomes a control target point, may be basically determined according to a vehicle speed, and overshoot and a convergence time may be controlled by appropriately adjusting a distance in consideration of the responsiveness of a steering control system. For example, as shown in FIG. 2, when the vehicle 10 travels, the steering angle controller 120 may calculate an angle α between the look ahead point and a vehicle heading direction using a sin rule, and calculate the steering angle as shown in Equation 1 below when an Ackerman steering angle model may be applied.

$$\delta = \tan^{-1}\frac{2L\sin\alpha}{l_d} \quad \text{[Equation 1]}$$

where δ may refer to a steering angle, $l_d$ may refer to a look ahead distance, α may refer to an angle between a vehicle heading and the look ahead point, and L may refer to a distance from a front wheel to a rear wheel of a wheelbase of the vehicle.

The steering angle controller 120 may perform kinematic steering control based on the look ahead distance. At this time, the steering angle controller 120 may control a front wheel steering angle using the pure-pursuit algorithm.

The torque vectoring controller 130 may calculate a lateral error and an angular error based on the path information and the traveling information measured by the measurement unit 110, generate a control moment based on the lateral error and the angular error, and control a motor torque of each motor based on the control moment. In other words, the torque vectoring controller 130 may perform the LKAS-based torque vectoring, thereby correcting the lateral error and distance error of the path information (traveling path).

Hereinafter, an operation of the torque vectoring controller 130 will be described in detail.

When the vehicle 10 travels at a speed v, the torque vectoring controller 130 may calculate the lateral error that is a distance error with a point closest to the front wheel of the vehicle and calculate an angular error between the vehicle heading and a traveling direction vector. A difference between a heading value of the vehicle 10 and a heading value of a point closest to the target path may be an angular error. In other words, the torque vectoring controller 130 may calculate the lateral error and the angular error using Equation 2 below.

$$\dot{e}_1 = \dot{y} + V_x(\psi - \psi_{des})$$

$$e_2 = \psi - \psi_{des} \qquad \text{[Equation 2]}$$

where $e_1$ may refer to the lateral error, $V_x$ may refer to the speed, $\psi$ may refer to a heading angle measured by the measurement unit 110, $\psi_{des}$ may refer to a target heading angle, $e_2$ may refer to the angular error, and y may refer to a distance from the center of gravity of the vehicle 10 to a turn center.

When the lateral error and the angular error are calculated, the torque vectoring controller 130 may generate a control moment based on the lateral error and the angular error. In other words, the torque vectoring controller 130 may generate a control moment M using Equation 3 below.

$$M = \frac{C_f C_r l}{C_f + C_r} \delta_f \qquad \text{[Equation 3]}$$

where $C_f$ may refer to a front wheel tire cornering stiffness, $C_r$ may refer to a rear wheel tire cornering stiffness, l may refer to a distance between the center of gravity and the wheels of the vehicle 10, and $\delta_f$ may refer to the front wheel steering angle.

Referring to Equation 3, the torque vectoring controller 130 may calculate the front wheel steering angle to generate the control moment. The front wheel steering angle $\delta_f$ may be calculated based on a dynamic model (dynamic lateral motion model) based on the lateral error and the angular error.

A system state function of the basic dynamic model (dynamic lateral motion model) relates to lateral position and yaw angle errors with respect to a road, and may be formulated with respect to the lateral position and speed errors at the look ahead point. The look ahead point affects a zero position and thus affects a damping ratio of a dominant pole. Accordingly, the system state function of the dynamic model (dynamic lateral motion model) may be generated as Equation 4 below with respect to a state vector $x = [e_1\ \dot{e}_1\ e_2\ \dot{e}_2]^T$, a control input $\delta_f$ and an external signal $\dot{\psi}_{des}$.

$$\dot{x} = Ax + B_1 \delta_f + B_2 \dot{\psi}_{des} \qquad \text{[Equation 4]}$$

$$A = \begin{bmatrix} 0 & 1 & 0 & 0 \\ 0 & -\frac{2C_{\alpha f} + 2C_{\alpha r}}{mV_x} & \frac{2C_{\alpha f} + 2C_{\alpha r}}{m} & \frac{-2C_{\alpha f}l_f + 2C_{\alpha r}l_r}{mV_x} \\ 0 & 0 & 0 & 1 \\ 0 & -\frac{2C_{\alpha f}l_f - 2|C_{\alpha r}l_r}{I_z V_x} & \frac{2C_{\alpha f}l_f - 2C_{\alpha r}l_r}{I_z} & -\frac{2C_{\alpha f}l_f^2 + 2C_{\alpha r}l_r^2}{I_z V_x} \end{bmatrix}$$

$$B_1 = \begin{bmatrix} 0 \\ \frac{2C_{\alpha f}}{m} \\ 0 \\ \frac{2C_{\alpha f}l_f}{I_z} \end{bmatrix}, B_2 = \begin{bmatrix} 0 \\ -\frac{2C_{\alpha f}l_f - 2C_{\alpha r}l_r}{mV_x} - V_x \\ 0 \\ -\frac{2C_{\alpha f}l_f^2 + 2C_{\alpha r}l_r^2}{I_z V_x} \end{bmatrix},$$

where $\dot{\psi}_{des}$ may refer to a target yaw rate and it may be $\delta_f = -Kx + \delta_{ff}$. $C_f$ may refer to the front wheel tire cornering stiffness, $C_r$ may refer to the rear wheel tire cornering stiffness, R may refer to a road curvature radius, $l_f$ may refer to a distance from the center of gravity to a front wheel axle, $l_r$ may refer to a distance from the center of gravity to a rear wheel axle, $\alpha$ may refer to the angle between the vehicle heading and the look ahead point, $I_z$ may refer to yaw inertia of the vehicle 10, m may refer to the total weight of the vehicle 10, f may refer to a front, r may refer to a rear, x may refer to a longitudinal direction, y may refer to a lateral direction, and $\delta_{ff}$ may refer to a feedforward steering angle. The feedforward steering angle $\delta_{ff}$ is a value calculated from a steady-state response of the state function, and may be $$\delta_{ff} = \frac{mV_x^2}{RL}\left(\frac{l_r}{2C_{\alpha f}} - \frac{l_f}{2C_{\alpha r}} + \frac{l_f}{2C_{\alpha r}}k_3\right) + \frac{L}{R} - \frac{l_r}{R}k_3.$$

Meanwhile, the front wheel steering angle $\delta_f$ may be expressed as the sum of a feedback steering angle $\delta_{FB}$ and the feedforward steering angle $\delta_{FF}$ as shown in Equation 5 below.

$$\delta_f = \delta_{FF} + \delta_{FB} \qquad \text{[Equation 5]}$$

The feedback steering angle $\delta_{FB}$ and the feedforward steering angle $\delta_{FF}$ may be expressed as in Equation 6 below.

$$\delta_{FB} = -Kx = -k_1 e_1 - k_2 \dot{e}_1 - k_3 e_2 - k_4 \dot{e}_2 \qquad \text{[Equation 6]}$$

$$\delta_{FF} = \frac{mv_x^2}{RL}\left(\frac{l_r}{C_f} - \frac{l_f}{C_r} + \frac{l_f}{C_r}k_3\right) + \frac{L}{R} - \frac{l_r}{R}k_3$$

where k1, k2, k3, and k4 may be arbitrary values (constants).

When the front wheel steering angle $\delta_f$ is calculated through Equation 5, the torque vectoring controller 130 may calculate the control moment using Equation 3.

When the control moment is calculated, the torque vectoring controller 130 may calculate the motor torque by dividing the control moment by a tread that is a distance between centers of left and right wheels. In other words, the torque vectoring controller 130 may calculate an additional motor torque using Equation 7 below.

$$\Delta T = \frac{M}{t} \qquad \text{[Equation 7]}$$

where $\Delta T$ may refer to the additional motor torque, t may refer to the tread, and M may refer to the control moment.

When the additional motor torque is calculated through Equation 7, the torque vectoring controller 130 may distribute the additional motor torque to each vehicle wheel (wheel).

The torque vectoring controller 130 may distribute the additional motor torque to a rear wheel motor and distribute a part of the additional motor torque to a front wheel motor when a drive torque and a braking torque exceed a maximum torque of the rear wheel motor. In other words, the torque vectoring controller 130 may distribute the additional motor torque to left and right rear wheels as shown in FIG. 3A. At this time, when the respective drive torques and braking torques required for the right rear wheel and the left rear wheel exceed a motor output limit, as shown in FIG. 3B, the torque vectoring controller 130 may distribute the drive torque and the braking torque to satisfy the required control moment by distributing a drive torque corresponding to a magnitude of the exceeding drive torque to the right front wheel, and distributing a braking torque corresponding to a magnitude of the exceeding braking torque to the left front wheel.

When a large amount of control moment is required due to the large lateral error and angular error, the torque vectoring controller 130 may prioritize the generation of the moment using the front wheel motor rather than controlling an autonomous traveling driving force. In addition, when the rear wheel motor is saturated in the case of non-4-wheel independent driving, the torque vectoring controller 130 may use a front wheel hydraulic braking force. For example, a torque vectoring by brake (TVBB) may be used.

Meanwhile, when it is difficult to overcome the lateral error/distance error even with the moment generated using the rear wheel motor, this may be regarded as having a risk that the vehicle 10 may slip. In this situation, even when the longitudinal control (target vehicle speed control) is given a lower priority, the lateral error and angular error control may be performed by using the front wheel motor or the front wheel hydraulic braking for the stability of the vehicle 10. This is a concept of a pre-control before entering an electronic stability control (ESC) from the viewpoint of lateral stability and may delay the ESC entry time point.

The ESC entry determination unit 140 may receive a first lateral slip angle calculated based on the lateral error and the angular error from the torque vectoring controller 130, receive a second lateral slip angle from the electronic stability control (ESC) unit, and control the driving of the ESC unit 150 according to a comparison result between the first lateral slip angle and the second lateral slip angle. In other words, the ESC entry determination unit 140 may determine whether to enter (drive) the control of the ESC unit 150 by comparing the first lateral slip angle in the LKAS and the second lateral slip angle in the ESC unit 150.

When a difference between the first lateral slip angle and the second lateral slip angle exceeds a preset certain value, the ESC entry determination unit 140 may notify occupants of the vehicle 10 of a warning signal, and transmit a control entry signal to the ESC unit 150. In other words, when the difference between the first lateral slip angle and the second lateral slip angle exceeds the certain value, the ESC entry determination unit 140 may determine that the ESC entry is needed, and transmit the control entry signal to the ESC unit 150. As described above, the ESC entry determination unit 140 may change the LKAS-based torque vectoring control to the ESC control by comparing an estimated value of the first lateral slip angle based on the distance error and lateral error of the LKAS and the second lateral slip angle based on chassis information from the ESC unit 150 for appropriate control convergence with the ESC unit 150.

The first lateral slip angle $\beta_1$ may be a value calculated based on the lateral error and the angular error as shown in Equation 8 below.

$$\beta_1 = \frac{\dot{y}}{V_x} = \frac{1}{V_x}(\dot{e}_1 - V_x e_2) \quad \text{[Equation 8]}$$

The second lateral slip angle $\beta_2$ may be a value calculated by using vehicle motion information such as a steering angle, a lateral angular speed, and a yaw rate as shown in Equation 9 below.

$$\beta_2 = \frac{-ma_{y,sensor} + \frac{l_r C_r - l_f C_f}{v_x} r + C_f \delta_f}{C_f + C_r} \quad \text{[Equation 9]}$$

The ESC unit 150 may be driven upon receiving the control entry signal from the ESC entry determination unit 140.

The ESC unit 150 is a device for controlling a posture of the vehicle 10 to prevent instability of vehicle traveling, and may improve the stability of the vehicle 10 by reducing an engine torque or performing a braking control for individual vehicle wheels when an unstable behavior of the vehicle 10 different from the driver's intention occurs.

The ESC unit 150 may control each vehicle wheel according to a braking control amount calculated based on the yaw rate and the second lateral slip angle $\beta_2$.

Meanwhile, the apparatus 100 for controlling the autonomous traveling of the independent driving electric vehicle according to the present disclosure may further include a communication unit (not shown) and a storage unit (not shown). The communication unit functions to notify the occupants of the warning signal, and may be implemented in various forms such as a wireless communication module, a mobile communication module, and a wired communication module.

The storage unit has a configuration of storing data related to the operation of the apparatus 100 for controlling the autonomous traveling, and program commands that may be executed by the steering angle controller 120, the torque vectoring controller 130, and the ESC entry determination unit 140. Here, the storage unit may use a known storage medium, and include a nonvolatile storage device such as a fixed hard drive or a removable storage device. The removable storage device may include a compact flash unit, a USB memory stick, and the like. The storage unit may also include volatile memories such as various random-access memories.

The apparatus 100 for controlling the autonomous traveling of the independent driving electric vehicle configured as described above may control the front wheel steering angle using the pure pursuit algorithm that uses the look ahead point among the future paths, and correct the lateral error and the angular error through the LKAS-based torque vectoring that uses the path lateral error and angular error of the current center of gravity, thereby performing the precise path follow-up control as well as enabling the smooth traveling.

Meanwhile, although FIG. 1 shows that the apparatus 100 for controlling the autonomous traveling is provided outside the vehicle 10, the apparatus for controlling the autonomous traveling may be an apparatus provided inside the vehicle 10

Figure 4:
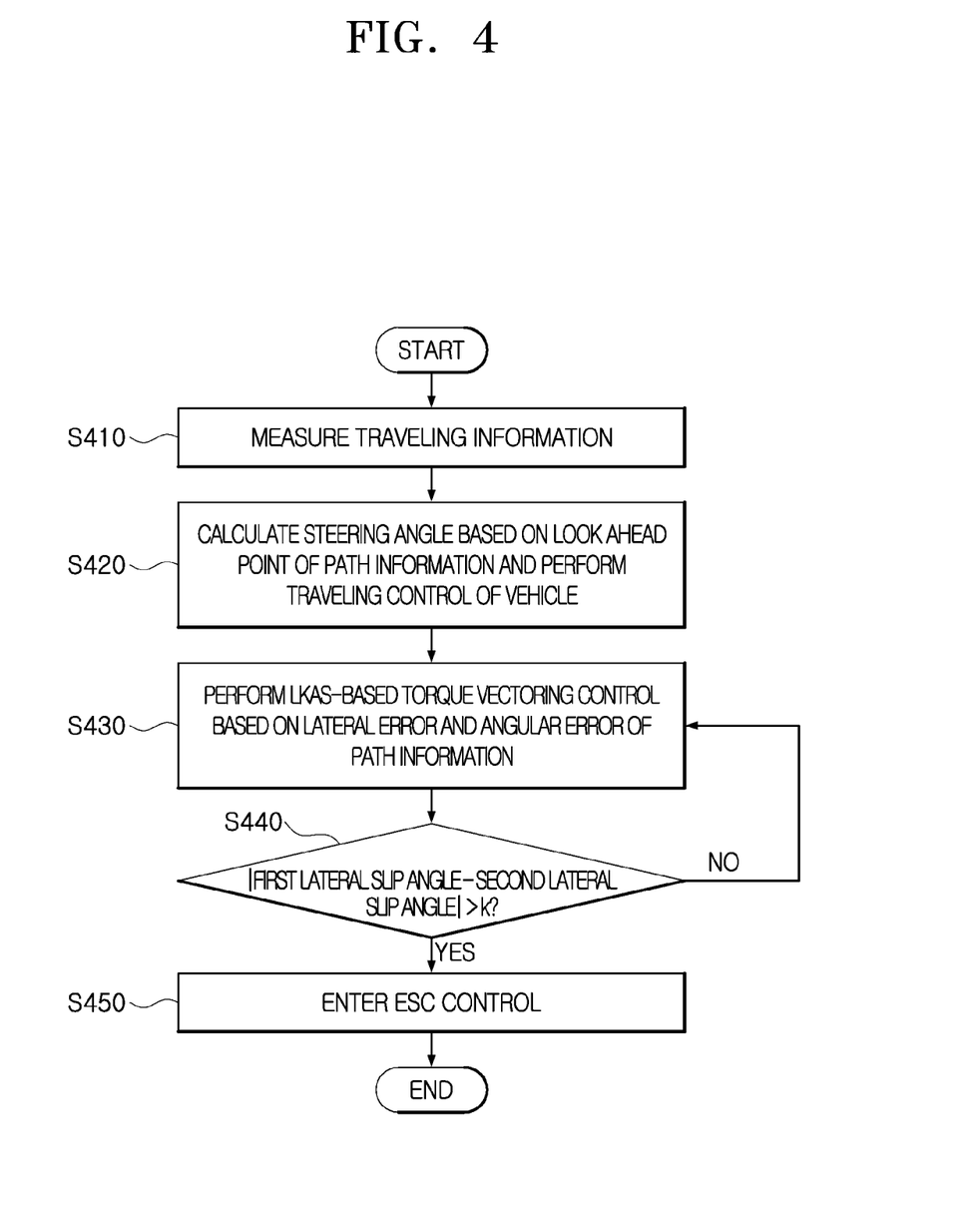
FIG. 4 is a flowchart for describing a method of controlling autonomous traveling of the independent driving electric vehicle according to one embodiment of the present disclosure.

FIG. 4 is a flowchart for describing a method of controlling autonomous traveling of the independent driving electric vehicle according to one embodiment of the present disclosure.

Referring to FIG. 4, the measurement unit 110 measures traveling information of the vehicle 10 (S410). In other words, the measurement unit 110 may measure the traveling information including a position, a steering angle, a yaw rate, a longitudinal speed, a wheel speed, a steering angular speed, a longitudinal speed, a lateral speed, a lateral acceleration, a longitudinal acceleration, and the like of the vehicle 10.

When operation S410 is performed, the steering angle controller 120 calculates the steering angle for following a look ahead point based on the path information of the vehicle 10 and the traveling information measured by the measurement unit 110, and controls the vehicle 10 according to the steering angle (S420). At this time, the steering angle controller 120 may control a front wheel steering angle using a pure-pursuit algorithm. In other words, the steering angle controller 120 may perform kinematic steering control based on a look ahead distance.

When operation S420 is performed, the torque vectoring controller 130 performs LKAS-based torque vectoring control based on a lateral error and an angular error of the path information (S430). In other words, the torque vectoring controller 130 may calculate the lateral error that is a distance error with a point closest to the front wheel of the vehicle, and calculate the angular error between the vehicle heading and the traveling direction vector. Then, the torque vectoring controller 130 may calculate the front wheel steering angle based on the lateral error and the angular error, and generate a control moment using the calculated front wheel steering angle. At this time, the torque vectoring controller 130 may generate the control moment using Equation 3. Then, the torque vectoring controller 130 may calculate an additional motor torque by dividing the control moment by a tread, which is a distance between centers of left and right vehicle wheels, and distribute the additional motor torque to a rear wheel motor. At this time, when the motor torque exceeds the maximum torque of the rear wheel motor, the torque vectoring controller 130 may distribute the additional motor torque to a front wheel motor.

In the embodiment of the present disclosure, it has been described that operation S430 is performed after operation S420, but operations S420 and S430 may be performed simultaneously.

Meanwhile, when the vehicle 10 loses stability and starts to slip, the ESC entry is essential.

Accordingly, the ESC entry determination unit 140 determines whether a difference between a first lateral slip angle received from the torque vectoring controller 130 and a second lateral slip angle received from the ESC unit 150 exceeds a preset certain value k (S440), and transmits an ESC control entry signal to the ESC unit 150 when the difference exceeds the preset certain value k (S450). In other words, when the difference between the first lateral slip angle of the LKAS and the second lateral slip angle of the ESC unit 150 exceeds the certain value, the ESC entry determination unit 140 may determine that ESC entry is needed, and change the LKAS-based torque vectoring control to the ESC control As described above, the apparatus and method for controlling the autonomous traveling of the independent driving electric vehicle according to one embodiment of the present disclosure may control the front wheel steering angle using the pure pursuit algorithm that uses the look ahead point among the future paths, and correct the lateral error and the angular error through the LKAS-based torque vectoring that uses the path lateral error and angular error of the current center of gravity, thereby enabling the smooth traveling even without requiring enormous computational performance, and performing the precise path follow-up control.

According to the apparatus and method for controlling the autonomous traveling of the independent driving electric vehicle according to one embodiment of the present disclosure, it is possible to delay the ESC entry time point because the constant moment control is performed by using the lateral error/angular error of the traveling path from the viewpoint of stability of the vehicle.

According to the apparatus and method for controlling the autonomous traveling of the independent driving electric vehicle according to one embodiment of the present disclosure, the ESC entry is essential when the vehicle loses stability and starts to slip, and it is possible to strengthen connectivity between autonomous traveling control and chassis control systems by providing an index for ESC entry in the constant moment control of the LKAS-based torque vectoring.

According to the apparatus and method for controlling the autonomous traveling of the independent driving electric vehicle according to one embodiment of the present disclosure, it is possible to improve the stability of the vehicle by first using a rear wheel motor so as not to hinder longitudinal control of an autonomous traveling system, and considering the correction of lateral/angular errors as a higher priority than the longitudinal control of the vehicle when a rear wheel motor is saturated.

According to the apparatus and method for controlling the autonomous traveling of the independent driving electric vehicle according to one embodiment of the present disclosure, it is possible to remove a cut corner phenomenon of the pure pursuit, and enable traveling on a road having a high curvature such as a U-turn.

Although the present disclosure has been described with reference to the embodiment shown in the drawings, this is merely illustrative, and those skilled in the art to which the present technology pertains will understand that various modifications and equivalent other embodiments are possible. Accordingly, the true technical scope of the present disclosure should be determined by the appended claims.

What is claimed is:

1. An apparatus for controlling autonomous traveling of an independent driving electric vehicle, the apparatus comprising:
   a measurement unit configured to measure traveling information of a vehicle;
   a steering angle controller configured to calculate a steering angle for following a look ahead point based on path information of the vehicle and the traveling information, and control the vehicle according to the steering angle; and
   a torque vectoring controller configured to calculate a lateral error and an angular error of the vehicle based on the path information and the traveling information, generate a control moment based on the lateral error and the angular error, and control a motor torque of each motor based on the control moment,
   wherein the torque vectoring controller is further configured to distribute to a front wheel motor an additional motor torque that exceeds a maximum torque of a corresponding rear wheel motor.

2. The apparatus of claim 1, wherein the steering angle controller calculates the steering angle by applying a look ahead distance based on the path information and the traveling information to a kinematic model.

3. The apparatus of claim 1, wherein the torque vectoring controller performs a lane keeping assist system (LKAS)-based torque vectoring.

4. The apparatus of claim 3, wherein the torque vectoring controller generates the control moment by applying the path information and the traveling information to a dynamic model.

5. The apparatus of claim 4, wherein the torque vectoring controller calculates a front wheel steering angle based on the lateral error and the angular error, and generates the control moment using the front wheel steering angle.

6. The apparatus of claim 1, wherein the torque vectoring controller generates an additional motor torque by dividing the control moment by a tread, which is a distance between centers of left and right vehicle wheels,
distributes the additional motor torque to a rear wheel motor, and
distributes a part of the additional motor torque to a front wheel motor when the motor torque exceeds a maximum torque of the rear wheel motor.

7. The apparatus of claim 1, further comprising an electronic stability control (ESC) entry determination unit configured to receive a first lateral slip angle calculated based on the lateral error and the angular error from the torque vectoring controller, receive a second lateral slip angle from an electronic stability control (ESC) unit, and determine whether to enter the ESC unit according to a comparison result between the first lateral slip angle and the second lateral slip angle.

8. The apparatus of claim 7, wherein the ESC entry determination unit transmits a control entry signal for driving the ESC unit to the ESC unit when a difference between the first lateral slip angle and the second lateral slip angle exceeds a preset certain value.

9. A method of controlling autonomous traveling of an independent driving electric vehicle, the method comprising:
measuring traveling information of a vehicle, by a measurement unit;
calculating a steering angle for following a look ahead point based on path information of the vehicle and the traveling information, and controlling the vehicle according to the steering angle, by a steering angle controller; and
calculating a lateral error and an angular error of the vehicle based on the path information and the traveling information, generating a control moment based on the lateral error and the angular error, and controlling a motor torque of each motor based on the control moment, by a torque vectoring controller,
wherein in the controlling of the motor torque of each motor, the torque vectoring controller distributes to a front wheel motor an additional motor torque that exceeds a maximum torque of a corresponding rear wheel motor.

10. The method of claim 9, wherein in the controlling of the vehicle according to the steering angle,
the steering angle controller calculates the steering angle by applying a look ahead distance based on the path information and the traveling information to a kinematic model.

11. The method of claim 9, wherein in the controlling of the motor torque of each motor,
the torque vectoring controller performs a lane keeping assist system (LKAS)-based torque vectoring.

12. The method of claim 11, wherein in the controlling of the motor torque of each motor,
the torque vectoring controller generates the control moment by applying the path information and the traveling information to a dynamic model.

13. The method of claim 12, wherein in the controlling of the motor torque of each motor,
the torque vectoring controller calculates a front wheel steering angle based on the lateral error and the angular error, and generates the control moment using the front wheel steering angle.

14. The method of claim 9, wherein in the controlling of the motor torque of each motor,
the torque vectoring controller generates an additional motor torque by dividing the control moment by a tread, which is a distance between centers of left and right vehicle wheels,
distributes the additional motor torque to a rear wheel motor, and
distributes a part of the additional motor torque to a front wheel motor when the motor torque exceeds a maximum torque of the rear wheel motor.

15. The method of claim 9, further comprising receiving a first lateral slip angle calculated based on the lateral error and the angular error from the torque vectoring controller, receiving a second lateral slip angle from an electronic stability control (ESC) unit, and determining whether to enter a control of the ESC unit according to a comparison result between the first lateral slip angle and the second lateral slip angle, by an ESC entry determination unit.

16. The method of claim 15, wherein in the determining of whether to enter the control of the ESC unit,
the ESC entry determination unit transmits a control entry signal for driving the ESC unit to the ESC unit when a difference between the first lateral slip angle and the second lateral slip angle exceeds a preset certain value.

* * * * *